United States Patent [19]

Barltrop

[11] 4,092,084
[45] May 30, 1978

[54] ROTOR FOR AN AUTOGIRO

[75] Inventor: Austin Barltrop, Pretoria, South Africa

[73] Assignee: The South African Inventions Development Corporation of Scientia, Pretoria, South Africa

[21] Appl. No.: 707,758

[22] Filed: Jul. 22, 1976

[51] Int. Cl.² .......................................... B64C 27/44
[52] U.S. Cl. ................................ 416/102; 416/140; 416/141
[58] Field of Search ............... 416/102, 107, 131, 138, 416/140 A, 148, 141; 244/17.11, 17.13, 17.25, 8

[56] References Cited

U.S. PATENT DOCUMENTS

| 2,045,355 | 6/1936 | Hays | 416/141 X |
| 2,684,122 | 7/1954 | Perry | 416/139 X |
| 2,684,722 | 7/1954 | Perry | 416/148 |
| 2,724,446 | 11/1955 | Hill | 416/102 |
| 2,946,390 | 7/1960 | Pozgay | 416/117 |
| 3,149,802 | 9/1964 | Wigal | 244/8 X |
| 3,204,700 | 9/1965 | Milligan | 416/148 |

FOREIGN PATENT DOCUMENTS

| Ad.90208 | 9/1967 | France | 244/17.25 |
| 1,053,320 | 3/1959 | Germany | 416/102 |
| 86,463 | 10/1957 | Netherlands | 416/148 |

Primary Examiner—Everette A. Powell, Jr.
Attorney, Agent, or Firm—Karl W. Flocks

[57] ABSTRACT

A two-bladed semi-rigid type tilt hub teetering rotor for an autogiro. The rotor has a spin-up condition in which it has an relatively small blade angle, and an in-flight condition in which the blade angle is relatively high. The rotor is adapted to alter automatically from its spin-up condition to its in-flight condition upon tilting of the hub at take-off.

13 Claims, 8 Drawing Figures

ROTOR FOR AN AUTOGIRO

This invention relates to an autogiro. In particular it relates to a rotor for an autogiro of the type having a two-bladed semi-rigid tilt hub teetering arrangement; and to an autogiro including such rotor.

According to the invention in an autogiro having a tiltable rotor, there is provided a method of operation which includes the steps of:

(a) during spin-up of the rotor and during forward movement of the autogiro at take-off prior to tilting of the rotor, having the blade angle of the rotor less than the blade angle of the rotor after take-off and during flight; and (b) upon tilting of the rotor altering the blade angle so that it assumes an increased value relative to the blade angle during spin-up.

Further according to the invention a rotor for an autogiro of the type having a two-bladed semi-rigid tilt hub teetering arrangement comprises:

(a) a hub for rotatable mounting on an autogiro about an upwardly extending axis;

(b) a bracket privotally connected to the hub about a teeter axis normal to the axis of rotation of the hub, the bracket being capable of teetering about said teeter axis during rotation of the hub about its axis of rotation;

(c) a pair of diameterically spaced and radially oppositely outwardly extending semi-rigid blades each fast with the bracket;

(d) at least one pivotal connection between at least part of each blade and the bracket, to permit pivoting of said part of the blade relative to the bracket to vary the coning angle of the rotor and simultaneously to vary the blade angle of the blade; and (e) stop formations fixed to the bracket on opposite sides of the pivotable blade parts for abutment against said parts to determine the extreme positions of said parts between which they are pivotable, namely first stop formations defining first extreme positions for the blade parts, corresponding to their rest or spin-up condition, and second stop formations defining second extreme positions for the blade parts, corresponding to their flight condition, in which their blade angle and the coning angle of the rotor are greater than the blade angle and coning angle respectively in the first extreme position.

By 'fixed to' the bracket is meant that the stop formations are mounted or form part of the bracket; or that they are provided on parts of the blades which are not pivotable relative to the bracket. The former case may be encountered when substantially the whole of each blade is pivotable relative to the bracket; and the latter case when only part of each blade is pivotable relative to the bracket.

Said blade parts may have the same blade angle in their first extreme position, and the the same blade angle in their second extreme position.

Said blade parts may have a negative blade angle in their first extreme position; and substantially the whole of each blade may be pivotable relative to the bracket about the associated pivotal connection.

The pivotal connection of each blade part may comprise a single pivot axis; and the pivotal connections of the blade parts may have a common pivot axis. Each pivotal connection may comprise a trunnion bearing via which the associated blade part is connected to the bracket.

The said parts of the blades may be interconnected for simultaneous pivoting relative to the bracket. The blade parts may be interconnected for simultaneous operation by means of a connecting member mounted on the bracket and pivotable relative to the bracket, the connecting member having a pair of abutments on opposite sides of the bracket and each blade part having a projection which projects from the blade part towards one of the abutments, the projections and connecting member being arranged such that pivoting of either of the blade parts about its pivotal connection causes, via engagement between its projection and one of the abutments, pivoting of the connection member relative to the bracket and hence, via engagement between the other abutment and the other projection, simultaneous pivoting of the other blade part about its pivotal connection. The connecting member and projections may be arranged such that the blades pivot by substantially the same amount during said simultaneous pivoting, the abutments each being provided by the wall of a passage or recess in the connecting member, into which the corresponding projection projects.

The coning angle of the rotor, when the blade parts are in their first extreme positions, may be substantially zero.

The invention extends to an autogiro including a rotor as above described, the hub being rotatably mounted about an upwardly extending axis of rotation, and said axis of rotation being tiltable in the fore and aft direction of the autogiro about a horizontal axis normal to said fore and aft direction.

The stop formations may be arranged such that the blade parts bear against the first stop formations under gravity in their first extreme positions when the autogiro is inoperative and has its rotor stationary, and such that the blade parts bear continuously against the second stop formations in their second extreme positions when the autogiro is in flight.

The invention will now be described by way of example, with reference to the accompanying diagrammatic drawings, in which.

Figure 1:
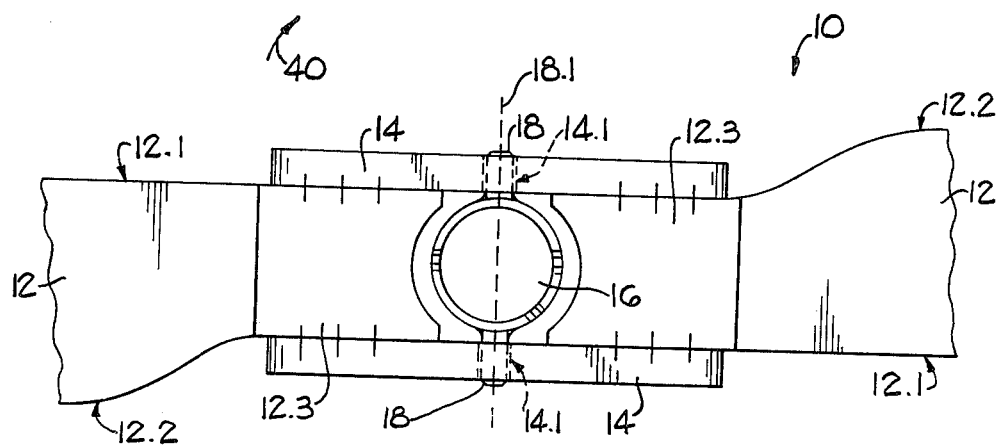
FIG. 1 shows, in part, a plan view of a prior art rotor, known to the applicant, for an autogiro of the type having a two-bladed semi-rigid tilt hub teetering arrangement, in its start-up condition during spin-up thereof.
Figure 2:
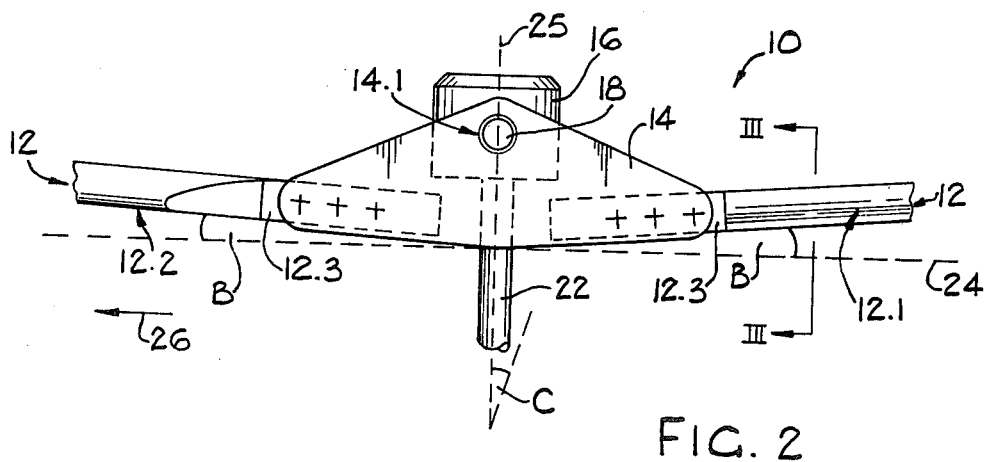
FIG. 2 shows a side elevation of the rotor of FIG. 1.
Figure 3:
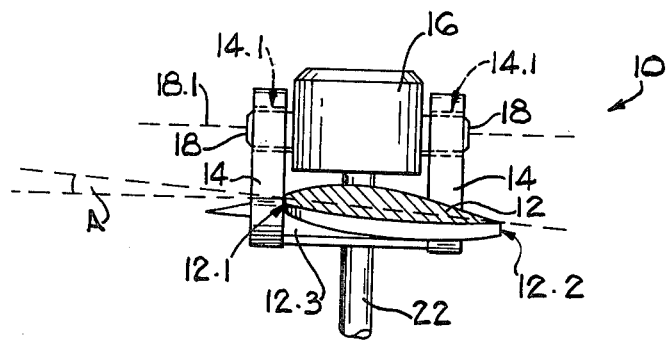
FIG. 3 shows a section in the direction of line III—III in FIG. 2.

With reference to FIGS. 1 to 3 of the drawings, reference numeral 10 generally designates a prior art rotor, known to the applicant for an autogiro of the type having a two-bladed semi-rigid tilt hub teetering arrangement. The rotor comprises a pair of diametrically oppositely outwardly projecting blades 12, each having a leading edge 12.1 and a trailing edge 12.2; a pair of spaced opposed brackets 14 to which the inner ends or roots 12.3 of the blades 12 are rigidly attached; a hub 16 to which the brackets 14 are respectively attached by teeter pins 18 so that the brackets 14 and blades 12 are teeterable, ie pivotable, relative to the hub 16 about a teeter axis 18.1; and an axle 22 to the end of which the hub 16 is rotatably attached. The teeter pins 18 are fast with and project diametrically oppositely outwardly from the hub 16, normal to the axle 22, and they are received in passages 14.1 in the brackets 14.

The axle 12 is hollow and a drive shaft (not shown) extends along its interior from the hub 16 to a power source (not shown) at the opposite end of the axle 22 (also not shown). The drive shaft is of conventional construction and forms part of a drive arrangement which drivingly interconnects the hub 16 and the power source, said drive arrangement including clutch means whereby the power source to the hub 16 can be drivingly connected or disconnected.

The axle 22 shown is straight and is parallel to the axis of rotation of the hub 16 about the axle 22. The teeter axis 18.1 is normal to said axis of rotation and axle 22. The blades 12 are shown, radially outwardly of the roots 12.3, as having a small positive blade angle A. At any particular distance from the hub 16 the blade angle A is fixed, but it can, and usually does, vary along the length of the blade. The blade angle is the angle of incidence of the blade at that position, and is shown in FIG. 3. In FIG. 2 the blades 12 are shown as having a small coning angle B, i.e. the angle between the blades and a plane 24 which is parallel to the teeter axis 18.1 and which is normal to the plane 25 which passes through the teeter axis 18.1 and bisects the brackets 14.

In use, at take-off, an autogiro on which the rotor 10 is mounted is held stationary, and the drive arrangement is brought into operation, with the axle 22 vertical, via the drive shaft and clutch means, to cause the power source to spin the hub 16 about the axle 22, in the direction of arrow 40, up to a desired speed of rotation. When the desired speed of rotation has been reached, the clutch means is operated to disconnect the power source from the hub, and the autogiro is immediately moved in a forward direction, for example by a propeller. When the autogiro reaches the take-off speed, the axle 22 is tilted rearwardly relative to the direction of movement, after which the autogiro rises from the ground. In FIG. 2 the direction of forward movement is shown by arrow 26 and the angle to which the axle 22 is tilted rearwardly is shown at C. After tilting and during flight the rotor teeters about the teeter pins 18, each blade teetering upwardly (the other blade simultaneously teetering downwardly by the same amount) about the pins 18, as it moves away from a lowermost position obliquely behind the axle 22, to a diametrically opposed uppermost position obliquely in front of said axle. This teetering arises primarily from lift on the blades caused by their aerodynamic profile, the lift being greater when the blade moves forwardly relative to arrow 26 (i.e. when air speed of the autogiro reinforces air flow over the blade caused by rotation of the rotor) than when the blade moves rearwardly relative to arrow 26 (i.e. when air speed of the autogiro counteracts air flow over the blade caused by rotation of the rotor). A secondary cause of teetering is the coning angle B. Because of this coning angle, each blade, when it traverses the 180° arc in front of the axle 22, will experience greater lift caused by air flow upwardly through the rotor resulting from forward motion of the autogiro, than when it traverses the 180° arc behind the axle 22. The lowermost position is thus to the left of the axle, and the uppermost position is to the right of the axle relative to the direction of movement of the autogiro.

A substantial blade angle A is desirable to promote airworthiness, rate of climb, and performance generally, after take-off. However, a substantial blade angle is a disadvantage prior to takeoff. The reason for this is that, for a relatively large blade angle the rate at which the speed of rotation of the rotor decays after spin-up and during forward movement of the autogiro prior to take-off, is relatively large. Furthermore, a large blade angle leads to a large power requirement for spin-up of the rotor to a desired speed of rotation, and leads to a relatively low maximum speed of rotation for a fixed power supply. On the other hand, a relatively small blade angle leads to a relatively high maximum speed of rotation for the same power supply, and a correspondingly low rate of decay of speed of rotation and a low power requirement for spin-up to a desired speed of rotation. However, the relatively small blade angle is a disadvantage as regards airworthiness, leading to a poor initial rate of climb and poor performance generally. The blade A is thus determined by way of a compromise between the low blade angle requirement prior to take-off and the high blade angle requirement after take-off.

Reference will now be made to FIGS. 4 to 8 inclusive, in which reference numeral 20 designates a rotor in accordance with the invention. Unless otherwise specified, like reference numerals refer to like parts.

Instead of the two brackets 14, a single bracket 30 is provided, via which the blades 12 are connected to the teeter pins 18. The bracket 30 is substantially hollow cylindrical, and has a pair of upwardly projecting ears 32 having passages 32.1 in which the teeter pins 18 are respectively pivotally received. Each of the blades 12 has its root 12.3 connected to the bracket 30 by means of a trunnion bearing 33. The trunnion bearings are aligned with each other so that they have a common pivotal axis 34 (shown in FIG. 4). Each of the roots 12.3 has an extension 12.4 extending towards the other blade. Each of the roots 12.3 is connected to the extension 12.4 of the other blade by a ball and socket joint 36. The ball and socket joints 36 are aligned with each other so that they are located on the pivotal axis 34 of the trunnion bearings 33.

On opposite sides of the bracket 30, under the teeter pins 18, there are provided a pair of diametrically opposed radially outwardly facing tangentially extending channels 38, each having an upper wall 38.1 and a lower wall 38.2. The extensions 12.4 extend past the bracket 30, respectively in the channels 38. The lower wall 38.2 of each channel 38 forms a first stop formation in the form of an upwardly facing abutment surface for the associated extension 12.4, and the upper wall 38.1 of each channel forms a second stop formation in the form of a downwardly facing abutment surface for the associated extension 12.4.

The blades 12 are pivotable about their trunnion bearings 33 between first extreme positions (FIGS. 4, 5 and 6) in which their extensions 12.4 abut the abutment faces 38.2, and second extreme positions (FIGS. 7 and 8) in which their extensions 12.4 abut the second abutment faces 38.1.

The abutment faces 38.2 are arranged so that when the extensions 12.4 are in abutment therewith, the blades 12 have a coning angle (as defined above) which is substantially zero. In this position at least part of each blade has a blade angle A (FIG. 6) which is small and negative. The average blade anggle A is such that during spin-up of the hub about the axle 22 with the axle vertical, the effect of the blade angle together with the mass of the blades 12 more than balances the lift on the blades 12 caused by the aerodynamic cross-sectional profile thereof, and so that at maximum speed of rotation and prior to tilting of the axle 22, accidental coning-up of the blade is avoided.

Figure 7:
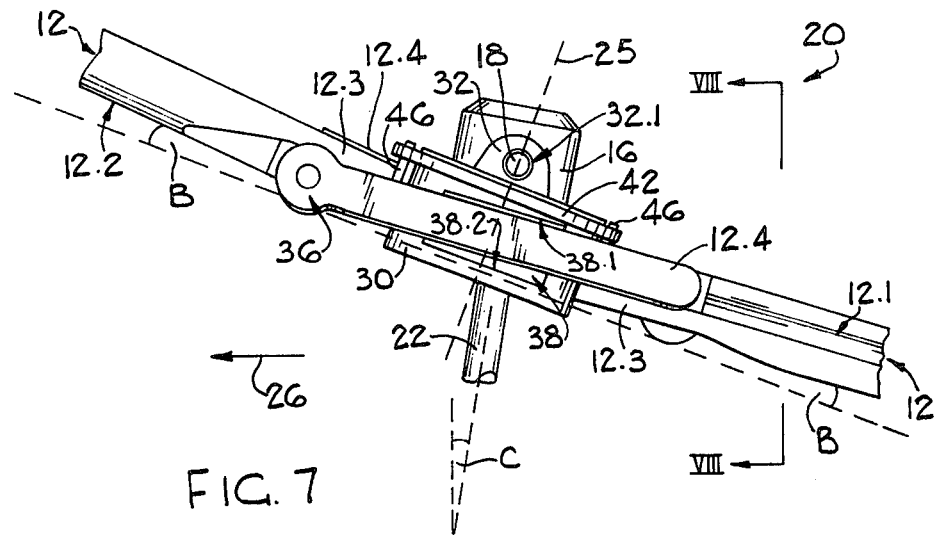
FIG. 7 shows a view corresponding to FIG. 5 of the rotor of FIG. 4, in its in-flight condition.
Figure 8:
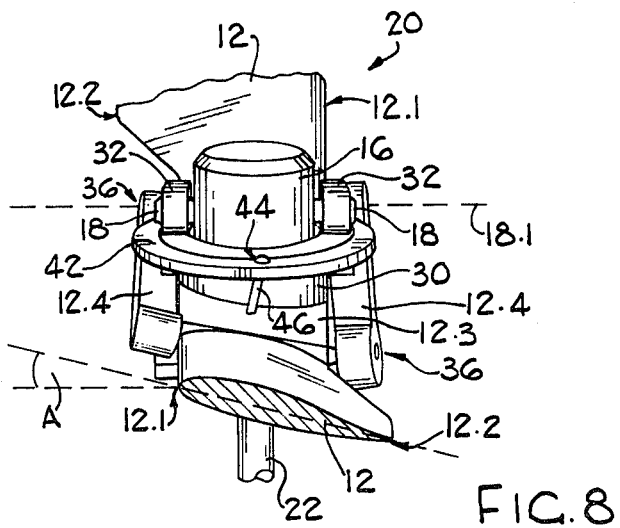
FIG. 8 shows a section in the direction of line VIII—VIII in FIG. 7.

The abutment faces 38.1 are arranged so that when the extensions 12.4 are in abutment therewith, the blades 12 have a desired coning angle B and a desired positive blade angle A (FIGS. 7 and 8). The desired blade angle A and coning angle B are achieved by providing a desired spacing and relative inclination between each pair of abutment faces 38.1, 38.2, and by providing the axis 34 of the trunnion bearings 33 at a desired angle D (which is neither zero nor a right angle) relative to the teeter axis 18.1 when viewed as in FIG. 4. The axis 34 in practice extends past the blades to the rear of the blades 12 (or when only part of each blade is pivotable relative to the bracket 30, to the rear of that part of the blade) by less than a right angle, relative to the direction of rotation 40 of the rotor.

The rotor 20 of FIGS. 4 to 8 inclusive has a drive arrangement similar to that of the rotor 10 described above for FIGS. 1 to 3. In use, at take-off, an autogiro on which the rotor 20 is mounted is held stationary, and the drive arrangement is brought into operation via the drive shaft and clutch means. This causes the power source to spin the hub 16 about the axle 22, up to a desired speed of rotation. During this spin-up, the negative pitch angle A (FIG. 6) of the blades 12 serves to ensure that the blades during spin-up bear downwardly via their extensions 12.4 on the lower abutment faces 38.2.

During the spin-up, the axle 22 is held vertical. When the desired maximum speed of rotation has been reached, the clutch means is operated to disconnect the power source from the hub 16, and the autogiro (as in the case with FIGS. 1 to 3) is immediately moved in a forward direction, by its propeller. During spin-up and initial forward movement, the small negative blade angle A is maintained.

When the autogiro reaches take-off speed, the axle 22 is tilted through angle C rearwardly relative to the direction of movement (FIG. 7). This tilting causes air flow to take place through the rotor 20 in the direction opposite to arrow 26. This airflow overcomes the mass of the blades 12, and urges them upwardly so that they pivot upwardly about the trunnion bearings 33, until their extensions 12.4 abut respectively against the upper abutment faces 38.1. This pivoting takes place substantially simultaneously for both the blades, and substantially immediately after the axle 22 has been tilted rearwardly, provided the autogiro has by then reached a substantial speed, preferably at least its minimum required take-off speed, in a forward direction. Pivoting of the blades 12 about the trunnion bearings 33 immediately causes the blades to take up the positive blade angle A (FIG. 8) and to take up the coning angle B (FIG. 7). As soon as the said blade angle A and coning angle B are achieved, the autogiro takes off, provided it has reached its minimum required take-off speed.

To ensure simultaneous pivoting of the blades 12 about their trunnion bearings 33, the blades may be interconnected for simultaneous operation by a connecting member in the form of a metal ring 42 shown in FIGS. 4 to 8 inclusive. The metal ring 42 seats slidably in a radially outwardly facing circumferential groove in the bracket 30, above the upper abutment faces 38.1 and below the ears 32. The ring 42 has a pair of diametrically opposed passages 44 therethrough, having longitudinal axes parallel to the longitudinal axis of the bracket 30. These passages 44 are located on opposite sides of the teeter axis 18.1, midway between the teeter pins 18 and spaced from said teeter axis 18.1. The roots 12.3 of the blades 12 have upward projections shown in the drawings as pins 46, which projects respectively into and through the openings 44.

In use, the walls of the passages 44 act as abutments for the pins 46. Thus, upward pivoting of either of the blades 12 about its trunnion bearing 33 will cause its pin 46 to engage the wall of the associated passage 44, thereby pivoting the ring 42 in the direction opposite to arrow 40 about the bracket 30, the ring 42 sliding circumferentially in its groove. Pivoting of the ring 42 about the bracket 30 causes the wall of the other passage 44 to engage the other pin 46, thereby pivoting the other blade 12 simultaneously upwardly about its trunnion bearing 33. The arrangement of the ring 42 and projections 46 thus ensures simultaneous pivoting of the blades 12 between their first positions (FIGS. 4 to 6) and their second positions (FIGS. 7 and 8).

Figure 4:
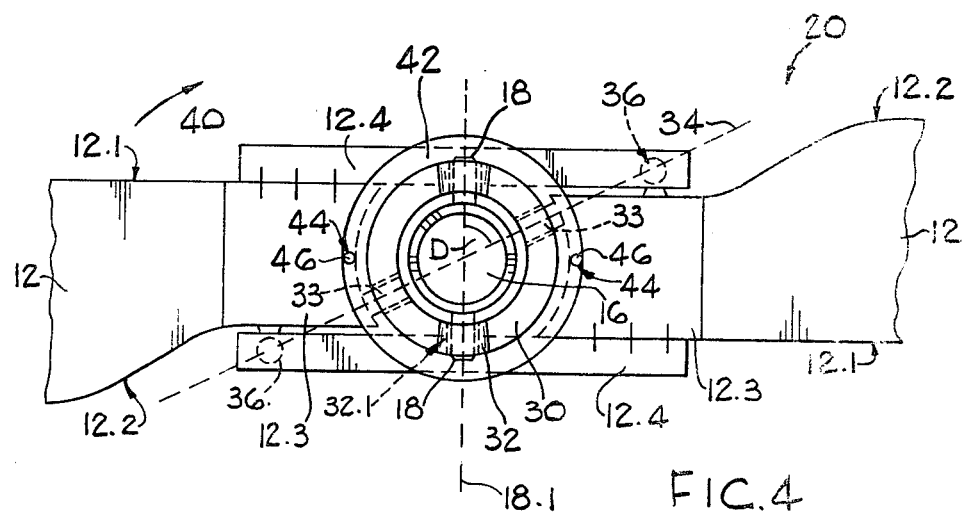
FIG. 4 shows a view, corresponding to FIG. 1, of a rotor in accordance with the invention, for an autogiro of the type having a two-bladed semi-rigid tilt hub teetering arrangement.
Figure 5:
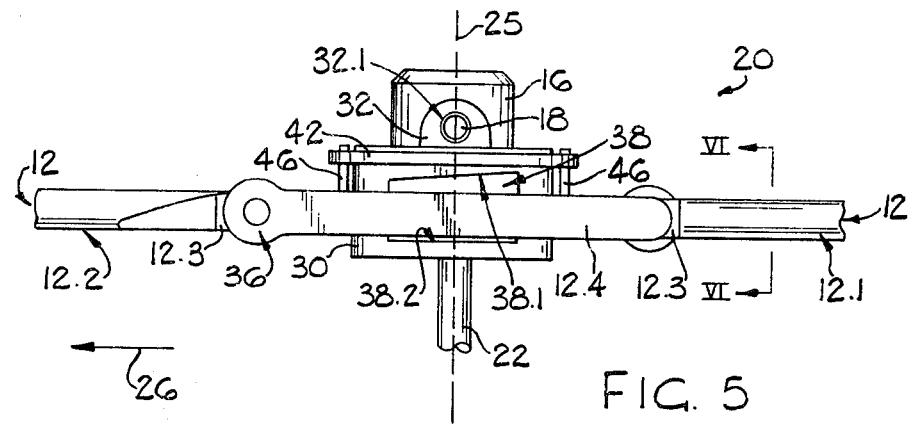
FIG. 5 shows a side elevation of the rotor of FIG. 4, with the rotor shown in its start-up condition during spin-up thereof.
Figure 6:
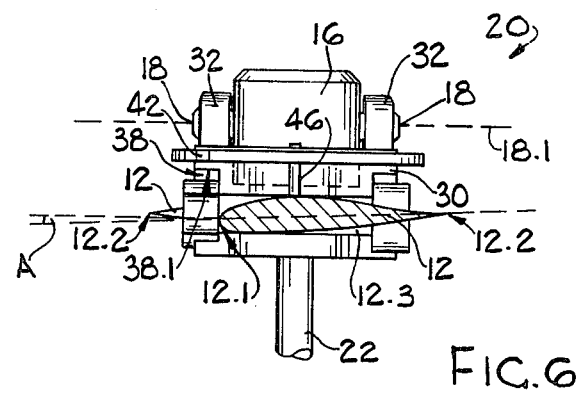
FIG. 6 shows a section in the direction of line IV—IV in FIG. 5.

An advantage of the rotor 20 according to the invention shown in FIGS. 4 to 8, when compared with the rotor 10 of FIGS. 1 to 3, is that the rotor 20 does not have a fixed blade angle A. During spin-up of the rotor 20 prior to the tilting of the axle 22, the extensions 12.4 are in abutment with the abutment faces 38.2, the coning angle B being zero and the blade angle A of at least part of each blade being at a small desired negative value (FIGS. 4 to 6). This small negative blade angle counteracts premature lift of the blades into their second extreme positions and ensures that the rate of decay of the speed of rotation of the rotor, after spin-up, approximates the minimum consistant with the particular blade profile used. Furthermore, the small negative blade angle A leads to an approximation of the mimimum power consumption required to spin-up the rotor to a particular desired maximum speed of rotation, and increased the maximum speed of rotation for a fixed power supply. Thus, with the rotor in its condition shown in FIGS. 4 to 6, the power requirement for spin-up and rate of decay of speed of rotation are less than those encountered with respect to the rotor of FIGS. 1 to 3, for a particular spin-up speed. Also, for a fixed power supply, the maximum speed of rotation during spin-up obtainable, is greater than that obtainable for the rotor of FIGS. 1 to 3, while the rate of decay of speed of rotation is less.

Once take-off speed has been reached, during forward movement of the autogiro, tilting of the axle 22 rearwardly automatically causes the blades to take up their second extreme positions in which they have the desired coning angle B (FIG. 7) and desired blade angle (FIG. 8). This arrangement permits the average blade angle A of FIG. 8 to be the same as or greater than the average blade angle shown in FIG. 3 for the rotor 10 of FIGS. 1 to 3. Thus, once the autogiro is airborne after its initial climb it can have any desired performance characteristics, insofar these are determined by the blade angle A. Thus, when compared with the motor of FIGS. 1 to 3, the invention provides a higher initial rate of climb, and better performance generally, particularly at take-off, and in particular a much shorter take-off run is permitted.

In changing from its spin-up condition of FIGS. 4 to 6 to its flight and take-off condition of FIGS. 7 and 8, the average blade angle of the blades of the rotor 20 increases from a small negative value to a substantial positive value. In this regard it should be noted that for this purpose a zero blade angle is regarded as greater than a negative blade angle.

In a direct comparison, when the brackets 14 of the rotor of FIGS. 1 to 3 are replaced by the bracket 30 of FIGS. 4 to 8, the rotor and autogiro being otherwise unchanged (except for the consequential changes shown in the drawings between FIGS. 1 to 3 on the one hand and FIGS. 4 to 8 on the other hand) take-off distance in quiet air at ground altitude of 5000 feet above sea level is redued from the order of about 450 feet to about 90 feet. This arises from the fact that the higher the rotor speed during forward movement prior to take-off is, the lower the forward speed of the autogiro need be, to achieve take-off. The reduction in take-off distance afforded by the invention thus illustrated the main substantial advantage of the invention over the rotor shown in FIGS. 1 to 3.

I claim:

1. A rotor for an autogiro of the type having a two-bladed semi-rigid tilt hub teetering arrangement, the rotor comprising:
   (a) a hub for rotatable mounting on an autogiro about an upwardly extending axis;
   (b) A bracket pivotally connected to the hub about a teeter axis normal to the axis of rotation of the hub, the bracket being capable of teetering about said teeter axis during rotation of the hub about its axis of rotation;
   (c) A pair of diameterically spaced and radially oppositely outwardly extending semi-rigid blades each fast with the bracket;
   (d) at least one pivotal connection between at least part of each blade and the bracket, to permit simultaneous pivoting of each of said parts of the blades relative to the bracket to increase the coning angle of the rotor and simultaneously to increase the blade angles of the blades or to decrease the coning angle of the rotor and simultaneously to decrease the blade angles of the blades; and
   (e) stop formations fixed to the bracket on opposite sides of the pivotable blade parts for abutment against said parts to determine the extreme positions of said parts between which they are pivotable, namely first stop formations defining first extreme positions for the blade parts, corresponding to their rest or spin-up condition, and second stop formations defining second extreme positions for the blade parts, corresponding to their flight condition, in which their blade angle and the coning angle of the rotor are greater than the blade angle and coning angle respectively in the first extreme position.

2. A rotor as claimed in claim 1, in which the blade parts have the same blade angle in their first extreme position, and in which the blades have the same blade angle in their second extreme position.

3. A rotor as claimed in claim 1, in which said blade parts have a negative blade angle in their first extreme position.

4. A rotor as claimed in claim 1, in which substantially the whole of each blade is pivotable relative to the bracket about the associated pivotal connection.

5. A rotor as claimed in claim 1, in which the pivotal connection of each blade part comprises a single pivot axis.

6. The rotor as claimed in claim 5, in which the pivotal connections of the blade parts have a common pivot axis.

7. A roter as claimed in claim 5, in which each pivotal connection comprises a trunnion bearing via which the associated blade part is connected to the bracket.

8. A rotor as claimed in claim 1, in which the said parts of the blades are interconnected for simultaneous pivoting relative to the bracket.

9. A rotor as claimed in claim 8, in which the blade parts are interconnected for simultaneous operation by means of a connecting member mounted on the bracket and pivotable relative to the bracket, the connecting member having a pair of abutments on opposite sides of the bracket and each blade part having a projection which projects from the blade part towards one of the abutments, the projections and connecting member being arranged such that pivoting of either of the blade parts about its pivotal connection causes, via engagement between its projection and one of the abutments, pivoting of the connection member relative to the bracket and hence, via engagement between the other abutment and the other projection, simultaneous pivoting of the other blade part about its pivotal connection.

10. A rotor as claimed in claim 9, in which the connecting member and projections are arranged such that the blades pivot by substantially the same amount during said simultaneous pivoting, the abutments each being provided by the wall of a passage or recess in the connecting member, into which the corresponding projection projects.

11. A rotor as claimed in claim 1, in which the coning angle of the rotor, when the blade parts are in their first extreme positions, is substantially zero.

12. An autogiro including a rotor as claimed in claim 1, the hub being rotatably mounted about an outwardly extending axis of rotation, and said axis of rotation being tiltable in the fore and aft direction of the autogiro about a horizontal axis normal to said fore and aft direction.

13. An autogiro as claimed in claim 12, in which the stop formations are arranged such that the blade parts bear against the first stop formations under gravity in their first extreme positions when the autogiro is inoperative and has its rotor stationary, and such that the blade parts bear continuously against the second stop formations in their second extreme positions when the autogiro is in flight.

* * * * *